United States Patent
MacFarlane et al.

(10) Patent No.: US 8,079,936 B2
(45) Date of Patent: Dec. 20, 2011

(54) GEAR SHIFT CONTROL OF A DUAL CLUTCH TRANSMISSION

(75) Inventors: Kevin MacFarlane, Northville, MI (US); Brian Keyse, Farmington Hills, MI (US); Eileen A. Davidson, Dexter, MI (US); David Orton, Westland, MI (US); Thomas R. Langeland, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 469 days.

(21) Appl. No.: 12/420,963

(22) Filed: Apr. 9, 2009

(65) Prior Publication Data
US 2010/0261577 A1    Oct. 14, 2010

(51) Int. Cl.
*B60W 10/04* (2006.01)
*B60W 10/00* (2006.01)
*B60W 10/02* (2006.01)

(52) U.S. Cl. .......... 477/109; 477/77; 477/107; 477/176

(58) Field of Classification Search ............... 477/107, 477/109, 77, 174, 175, 176, 180, 181; 74/335, 74/329, 331, 340; 192/3.54, 3.55
See application file for complete search history.

(56) References Cited

U.S. PATENT DOCUMENTS

| | | | |
|---|---|---|---|
| 6,819,997 B2 | 11/2004 | Buchanan et al. | |
| 6,887,184 B2 | 5/2005 | Buchanan et al. | |
| 7,048,672 B2 | 5/2006 | Bothe et al. | |
| 7,086,989 B2 | 8/2006 | Siebigteroth et al. | |
| 7,300,381 B2 | 11/2007 | Badillo et al. | |
| 7,326,149 B2 | 2/2008 | Kraska et al. | |
| 7,351,183 B2 | 4/2008 | Fujii et al. | |
| 2004/0166990 A1 | 8/2004 | Buchanan et al. | |
| 2004/0166991 A1 | 8/2004 | Buchanan et al. | |
| 2004/0172184 A1 | 9/2004 | Vukovich et al. | |
| 2004/0185985 A1* | 9/2004 | Inoue .............................. | 477/70 |
| 2004/0224820 A1 | 11/2004 | Matsumura et al. | |
| 2005/0064990 A1 | 3/2005 | Berger | |
| 2005/0064991 A1 | 3/2005 | Benz | |
| 2005/0072255 A1 | 4/2005 | McCrary et al. | |
| 2005/0272559 A1 | 12/2005 | Bothe et al. | |
| 2007/0240530 A1 | 10/2007 | Ogami et al. | |
| 2007/0265137 A1 | 11/2007 | Jiang | |
| 2008/0139362 A1 | 6/2008 | Fujii et al. | |

* cited by examiner

*Primary Examiner* — Roger Pang
(74) *Attorney, Agent, or Firm* — David B. Kelley, Esq.; MacMillan, Sobanski & Todd, LLC

(57) ABSTRACT

A method for controlling a gear shift of a dual clutch transmission having an offgoing clutch and an oncoming clutch, includes using torque transmitted by the oncoming clutch to control torque at a transmission output, using a speed of a power source to control a transfer of torque between the offgoing clutch and the oncoming clutch, and varying said torque capacity to produce a target slip across the oncoming clutch when the shift is completed.

17 Claims, 2 Drawing Sheets

GEAR SHIFT CONTROL OF A DUAL CLUTCH TRANSMISSION

BACKGROUND OF THE INVENTION

1. Field of the Invention

This invention relates generally to a dual input clutch powershift transmission for a motor vehicle. In particular, the invention pertains to controlling the input clutches during gear ratio changes produced by such transmissions.

2. Description of the Prior Art

A powershift transmission is a geared mechanism having two input clutches, which alternately connect a power source, such as an engine or electric motor, to two transmission input shafts.

The transmission produces multiple gear ratios in forward drive and reverse drive though operation of gearing arranged in a dual layshaft configuration between the transmission input and its output. One input clutch transmits torque between the input and a first layshaft associated principally with even-numbered gears; the other input clutch transmits torque between the transmission input and a second layshaft associated principally with odd-numbered gears. The transmission produces gear ratio changes by alternately engaging a first input clutch and running in a current gear, disengaging the second input clutch, preparing a power path in the gearing for operation in the target gear, disengaging the first clutch, engaging the second clutch and preparing another power path in the gearing for operation in the next gear.

Because a dual clutch transmission has no torque converter to provide damping, such transmissions begin and end each gear shift with the holding clutch, i.e., the input clutch through which engine torque is transmitted to the transmission input shaft for the target gear, slipping. To provide acceptable shift quality, it is necessary to maintain the correct slip without excess flare and without locking the holding clutch. At the same time, the input clutches must maintain sufficient torque at the output shaft to provide consistent acceleration before, during and after the shift.

The magnitude slip across the input clutches must be closely controlled of slip across the input clutches. In addition, clutch torque at the end of each gear should be adjusted so that engine torque matches driver demanded torque and clutch slip is in equilibrium within a target slip before control authority is passed a non-shifting slip control.

SUMMARY OF THE INVENTION

A method for controlling a gear shift of a dual clutch transmission having an offgoing clutch and an oncoming clutch, includes using torque transmitted by the oncoming clutch to control torque at a transmission output, using a speed of a power source to control a transfer of torque between the offgoing clutch and the oncoming clutch, and varying said torque capacity to produce a target slip across the oncoming clutch when the shift is completed.

The method provides direct control of the engine speed trajectory since it is necessary to closely control the amount of slip before, during and after the shift. In addition, it adjusts clutch torque at the end of the shift so that the engine torque has returned to the driver demanded value and the slip is at equilibrium or within a desired range when the shift is completed.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
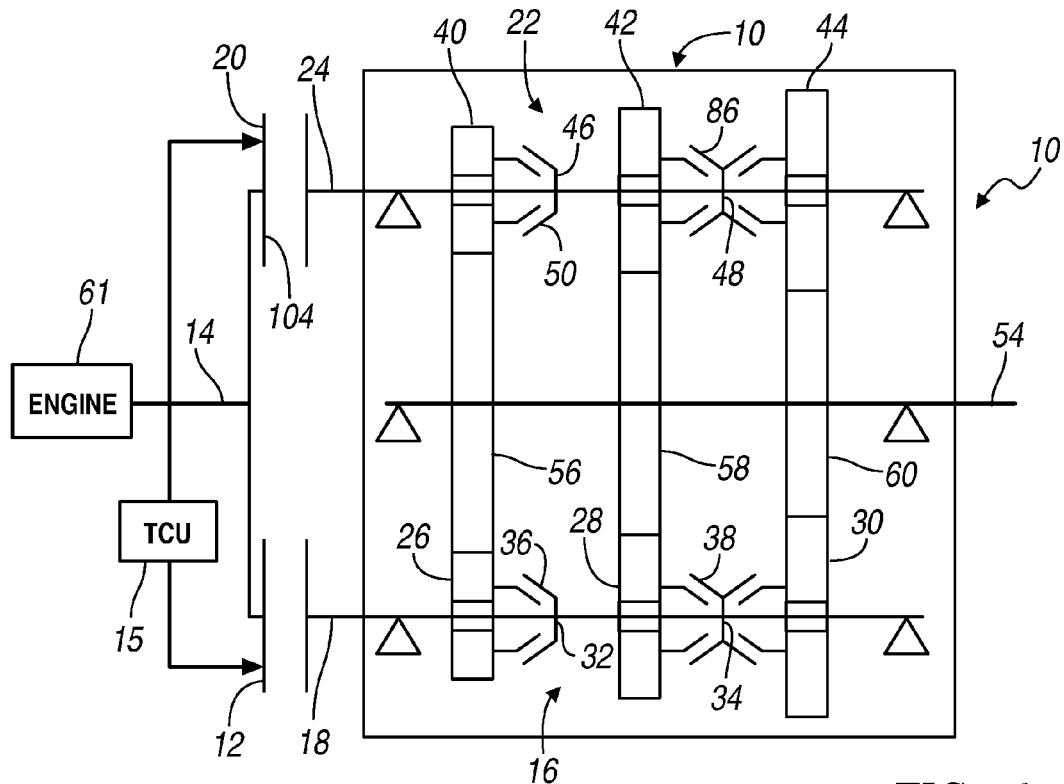
FIG. 1 is a schematic diagram showing details of a dual input clutch powershift transmission.

Referring now to the drawings, there is illustrated in FIG. 1 a dual dry clutch powershift transmission 10 including a first dry input clutch 12, which selective connects the input 14 of transmission 10 alternately to the even-numbered gears 16 associated with a first layshaft 18, and a second dry input clutch 20, which selective connects the input 20 alternately to the odd-numbered gears 22 associated with a second layshaft 24.

Input 14 is driveably connected to a power source such as an internal combustion engine or an electric motor. An electronic transmission control module (TCM) 15 controls the input clutches 12, 20 through command signals sent to solenoid-actuated servos, which actuate the input clutches. The TCM 15 includes a microprocessor accessible to electronic memory and containing control algorithms expressed in computer code, which are executed repeatedly at frequent intervals.

Shaft 18 supports pinions 26, 28, 30, which are each journalled on shaft 18, and couplers 32, 34, which are secured to shaft 18. Pinions 26, 28, 30 are associated respectively with the second, fourth and sixth gears. Coupler 32 includes a sleeve 36, which can be moved leftward to engage pinion 26 and driveably connect pinion 26 to shaft 18. Coupler 34 includes a sleeve 38, which can be moved leftward to engage pinion 28 and driveably connect pinion 28 to shaft 18. Sleeve 38 can be moved rightward to engage pinion 30 and driveably connect pinion 30 to shaft 18.

Shaft 24 supports pinions 40, 42, 44, which are each journalled on shaft 24, and couplers 46, 48, which are secured to shaft 24. Pinions 40, 42, 44 are associated respectively with the first, third and fifth gears. Coupler 46 includes a sleeve 50, which can be moved leftward to engage pinion 40 and driveably connect pinion 40 to shaft 24. Coupler 48 includes a sleeve 52, which can be moved leftward to engage pinion 42 and driveably connect pinion 42 to shaft 24. Sleeve 52 can be moved rightward to engage pinion 44 and driveably connect pinion 44 to shaft 24.

Output 54 supports gears 56, 58, 60, which are each secured to shaft 54. Gear 56 meshes with pinions 26 and 40. Gear 58 meshes with pinions 28 and 42. Gear 60 meshes with pinions 30 and 44.

Couplers 32, 34, 46 and 48 may be synchronizers, or dog clutches or a combination of these.

Figure 2:
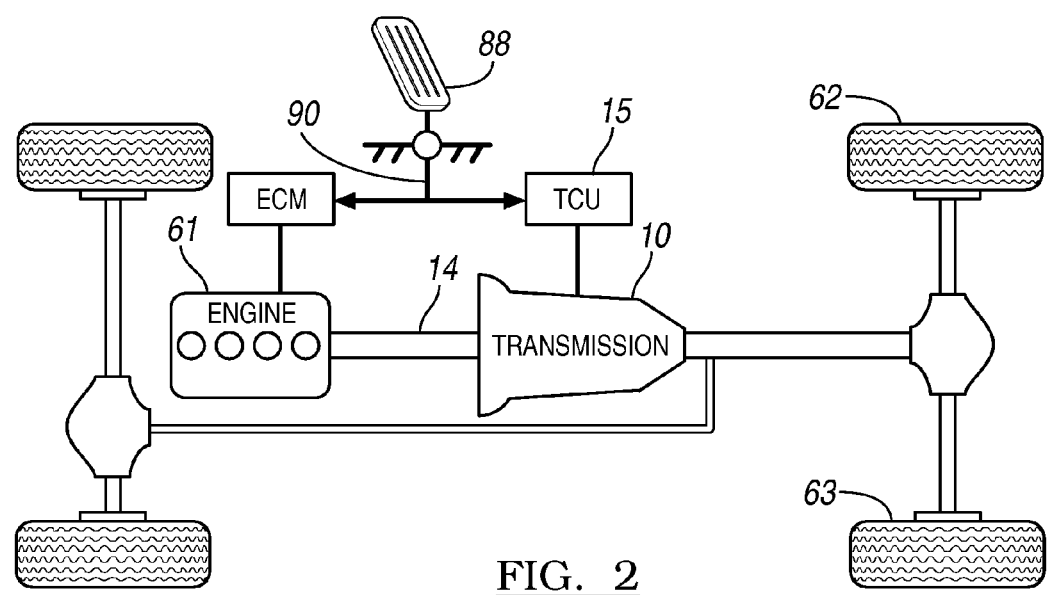
FIG. 2 is a schematic diagram of a vehicle powertrain that includes an engine and a dual clutch powershift transmission.

First gear is produced by using coupler 46 to driveably connect pinion 40 to shaft 24 and then engaging input clutch 20. Power produced by a power source, such as an internal combustion engine 61, is transmitted by a first power path, which includes input 14, clutch 20, shaft 24, pinion 40, gear 56 and output 54. As FIG. 2 illustrates, the transmission output 54 is driveably connected to the rear wheels 62, 63 of the vehicle. The transmission 10 is then prepared for an upshift to second gear by using coupler 32 to driveably connect pinion 26 to shaft 18. In second gear, power produced by the engine 61 is transmitted through a second power path, which includes input 14, clutch 12, shaft 18, pinion 26, gear 56 and output 54.

In response to the TCU 15 producing a command for an upshift to second gear, a torque transfer between the input clutches 20, 12 occurs whereby the torque transmitted by the offgoing clutch 20 decreases along a ramp 64 until the clutch is fully disengaged and torque transmitted by the oncoming clutch 12 decreases along a ramp 66 prior to that clutch becoming fully engaged.

Figure 3A:
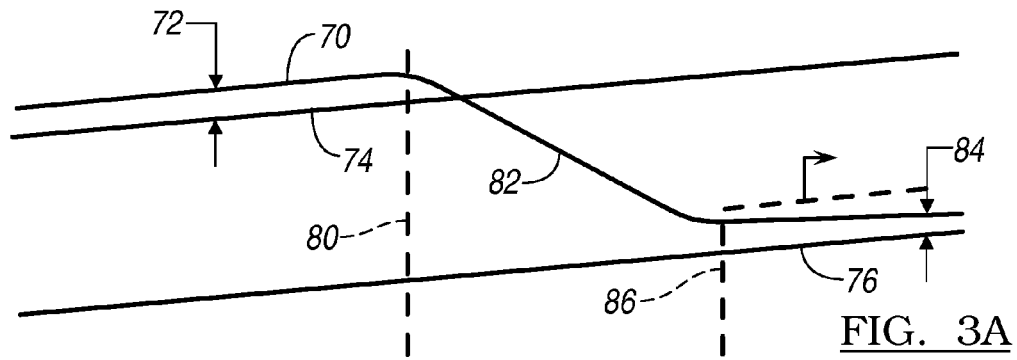
FIG. 3A is a graph showing the variation of engine speed during an upshift.
Figure 3B:
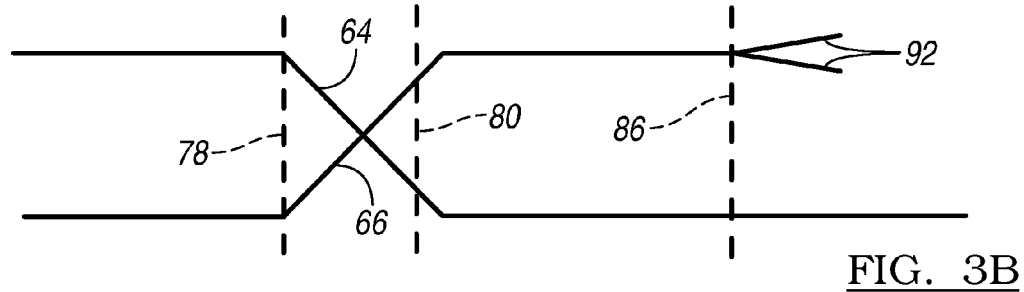
FIG. 3B is a graph showing the variation of clutch torque during the upshift.

FIGS. 3A and 3B illustrate the steps of the control method with reference to engine speed and torque during an upshift from a starting gear, which, for purposes of this example, is first gear, to a target gear, which is second gear. That gear shift is often referred to as a 1-2 upshift.

The engine control module (ECM) is an electronic controller containing a microprocessor accessible to electronic memory containing algorithms stored in computer code. The ECM controls engine speed 70 to a calibrateable delta speed 72 above the synchronous speed 74 in the starting gear, i.e., first gear. The oncoming clutch 12 is then slipping due to delta speed 72.

The synchronous speed is the speed of the engine 60 that corresponds to the current vehicle speed when a transmission gear is engaged and the input clutch 12, 20, associated with that gear, is locked. For example, the synchronous speed 76 for second gear is the speed of the engine 60 and input 14 at the current vehicle speed with input clutch 12 fully engaged or locked and with coupler 32 actuated to driveably connect pinion 26 to layshaft 18, thereby engaging second gear. The synchronous speed 74 for first gear is the speed of the engine 60 and input 14 at the current vehicle speed with input clutch 20 locked and with coupler 46 actuated to driveably connect pinion 40 to layshaft 24, thereby engaging first gear.

The torque transfer from clutch 20 to clutch 12 begins at 78 when slip across the oncoming clutch 12 is in equilibrium, i.e., relatively constant.

When the oncoming clutch 12 reaches a predetermined fraction of its torque capacity at 80, the desired engine speed 70 is controlled along a predefined speed ramp 82 to produce a desired magnitude of slip across clutch 12 near the end of the upshift. Toward the end of the upshift, the desired engine speed 70 is a calibrateable delta speed 84 above the synchronous speed 76 for the target gear, i.e., second gear, and the oncoming clutch 12 is slipping due to delta speed 84.

Several techniques may be used to ensure sufficient torque reduction to begin the ratio change without objectionable inertia torque transfer to the output shaft: (1) Clutch capacity is lower than in a conventional approach. The engine speed controller may have sufficient bandwidth to reduce engine torque sufficiently while executing the speed trajectory; (2) A low initial speed set point can be provided to create a large initial error, and hence faster response, from the engine speed controller; (3) In addition to engine speed, engine torque may be commanded to provide an open loop baseline for the speed control; and (4) The transmission controls could achieve the desired speed trajectory solely through closed loop control of engine torque.

As the upshift approaches its conclusion at 86, slip across oncoming clutch 12 is controlled by monitoring the difference between the driver's demanded engine torque and the current engine torque necessary to maintain a target clutch slip at the end of the shift. The magnitude of driver demanded engine torque is indicated by the position or displacement of the accelerator pedal 88. A signal 90 representing accelerator pedal position is supplied as input to the ECM and a transmission control unit (TCU).

The torque transmitted by the oncoming clutch 12 is increased or decreased, preferably along a ramp 92 having constant slope, until the difference between the driver's demanded engine torque and the current engine torque falls below a reference torque difference or torque error.

As clutch torque ramps toward the equilibrium value, the engine controller ECM repetitively commands engine torque, which approaches the driver's demand torque in order to maintain the desired slip across the oncoming clutch 12.

At the end of the 1-2 upshift, engine torque is near the driver's demand torque, and the slip across clutch 12 is in equilibrium, i.e., substantially constant, before terminating execution of the upshift control algorithm.

If the engine torque fails to achieve clutch slip equilibrium, execution of the upshift control algorithm ends upon a timer running to a terminal count.

Downshifts

An algorithm for controlling downshifts in a dual clutch transmission 10 must maintain some slip across the oncoming clutch to minimize torque oscillations after a transfer of torque from the off-going clutch 12 to the oncoming clutch 20 occurs.

Figure 4A:
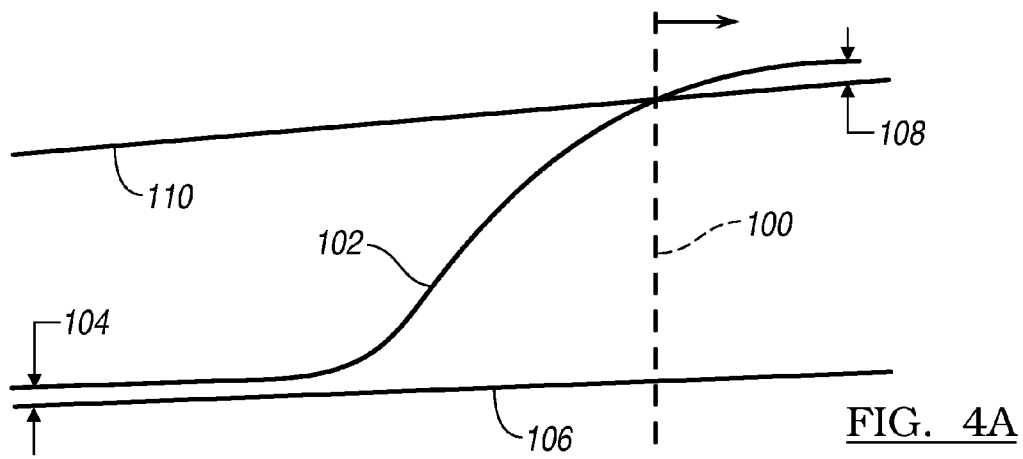
FIG. 4A is a graph showing the variation of engine speed during a downshift.
Figure 4B:
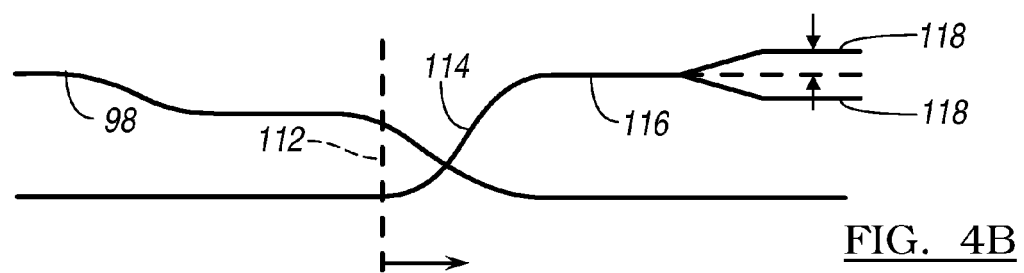
FIG. 4B is a graph showing the variation of clutch torque during the downshift.

As illustrated in FIGS. 4A and 4B, the downshift begins by reducing torque 98 transmitted by the offgoing clutch 12 to a magnitude at which clutch 12 is fully released or disengaged. When the downshift reaches a reference magnitude of percent-shift-complete at 100, engine speed control begins, which allows engine speed 102 to increase from a predetermined delta speed 104 above the synchronous speed 106 of the initial gear to a calibrateable delta speed 108 above the synchronous speed 110 of the target gear. As an alternative to the downshift reaching a reference magnitude of percent-shift-complete, slip across the offgoing clutch 12 may be allowed to increase steadily from zero slip to about 50 rpm at 100, whereupon engine speed control begins.

At 112, the torque transmitted by oncoming clutch 12 increases along a ramp 114 to the magnitude of driver demanded torque 116, as represented by the position of the accelerator pedal 88.

Similar to upshifts, the difference between the driver's demanded engine torque and the current engine torque necessary to maintain the target clutch slip at the end of the shift is monitored.

The oncoming clutch torque is changed up or down, preferably along a linear ramp, until the difference between the driver's demanded engine torque and the current engine torque falls below a target or reference torque difference.

As oncoming clutch torque changes toward the equilibrium value, the engine controller ECM commands engine torques that approach the driver demand torque in order to maintain a desired slip across the oncoming clutch.

At the end of the downshift, engine torque is near the driver demand torque, and the oncoming clutch slip is substantially constant prior to terminating execution of the downshift control algorithm.

If the engine torque fails to achieve clutch slip equilibrium, execution of the control algorithm ends upon a timer running to a terminal count, whereupon control passes to a non-shifting slip control algorithm.

In accordance with the provisions of the patent statutes, the preferred embodiment has been described. However, it should be noted that the alternate embodiments can be practiced otherwise than as specifically illustrated and described.

The invention claimed is:

1. A method for controlling a gear shift of a dual clutch transmission, comprising:
   (a) after increasing torque in an oncoming clutch, producing engine speed greater than synchronous speed in a target gear;
   (b) controlling slip across said clutch such that a difference between demanded engine torque and current engine torque is less than a reference difference;
   (c) producing a target slip across the oncoming clutch at the end of the shift by reducing said difference.

2. The method of claim 1 wherein step (a) further comprises:
   maintaining engine speed at a first speed greater than a synchronous speed of a current gear;
   reducing said speed;
   maintaining said speed at a second speed greater than a synchronous speed of the target gear.

3. The method of claim 2 wherein:
   the first speed differs from the synchronous speed of the current gear by a first predetermined speed;
   the second speed differs from the synchronous speed of the target gear by a second predetermined speed.

4. The method of claim 2 wherein reducing said speed further comprises changing said speed from the first speed to the second speed during a downshift.

5. The method of claim 1 wherein step (a) further comprises:
   maintaining said engine speed at a first speed greater than a synchronous speed of a current gear;
   increasing said speed;
   maintaining said engine speed at a second speed greater than a synchronous speed of the target gear.

6. The method of claim 5 wherein:
   the first speed differs from the synchronous speed of the current gear by a first predetermined speed;
   the second speed differs from the synchronous speed of the target gear by a second predetermined speed.

7. The method of claim 5 wherein increasing said engine speed further comprises changing said engine speed from the first speed to the second speed during a downshift.

8. A method for controlling a gear shift of a dual clutch transmission, having an offgoing clutch and an oncoming clutch, comprising:
   (a) controlling a speed of a power source at a first speed greater than a synchronous speed of a current gear;
   (b) decreasing torque transmitted by the offgoing clutch and increasing torque transmitted by the oncoming clutch;
   (c) controlling the speed of a power source toward a second speed greater than a synchronous speed of a target gear;
   (d) controlling torque transmitted by the oncoming clutch to produce a target slip across the oncoming clutch when the shift is completed.

9. The method of claim 8 further comprising determining that slip across the offgoing clutch is constant before executing step (b).

10. The method of claim 8 wherein:
    the first speed differs from the synchronous speed of the current gear by a first predetermined speed;
    the second speed differs from the synchronous speed of the target gear by a second predetermined speed.

11. The method of claim 10 further comprising reducing said speed from the first speed to the second speed during an upshift.

12. The method of claim 8 wherein:
    the first speed differs from the synchronous speed of the current gear by a first predetermined speed;
    the second speed differs from the synchronous speed of the target gear by a second predetermined speed.

13. The method of claim 8 further comprising increasing said speed from the first speed to the second speed during a downshift.

14. The method of claim 8 wherein step (d) further comprises:
    maintain a target clutch slip at the end of the shift by maintaining a difference between a driver demanded power source torque and a current power source torque.

15. A method for controlling a gear shift of a dual clutch transmission, comprising:
    (a) decreasing torque transmitted by an offgoing clutch and increasing torque transmitted by an oncoming clutch;
    (b) controlling a speed of an engine toward a speed greater than a synchronous speed of a target gear;
    (c) controlling torque transmitted by the oncoming clutch such that a difference between a demanded engine torque and a current engine torque is less than a target error;
    (d) controlling engine torque such that slip across the oncoming clutch is within a target range when the shift is completed.

16. The method of claim 15 wherein step (a) further comprises increasing torque transmitted by an oncoming clutch to the demanded engine torque.

17. The method of claim 15 further comprising determining that the shift has reached a desired fraction of being completed before executing step (b).

* * * * *